United States Patent [19]

Huggett

[11] Patent Number: 5,583,504
[45] Date of Patent: Dec. 10, 1996

[54] METHOD AND SYSTEM OF PRODUCING PHASE FRONT DISTORTION

[75] Inventor: William K. Huggett, Ypsilauti, Mich.

[73] Assignee: United States of America as represented by the Secretary of the Air Force, Washington, D.C.

[21] Appl. No.: 24,933

[22] Filed: Apr. 1, 1970

[51] Int. Cl.⁶ ............................................. G01S 7/38
[52] U.S. Cl. ............................................. 342/15
[58] Field of Search .................... 343/6.8 R, 18 E; 342/15

[56] References Cited

U.S. PATENT DOCUMENTS

| | | | |
|---|---|---|---|
| 3,715,755 | 2/1973 | Goldan | 342/15 |
| 3,720,952 | 3/1973 | Lawsine | 342/15 |
| 3,891,989 | 6/1975 | Barney et al. | 342/15 |
| 3,896,438 | 7/1975 | Schrader, Jr. | 342/15 |
| 3,896,441 | 7/1975 | Richmond | 342/15 |
| 3,909,828 | 9/1975 | Israel et al. | 342/15 |
| 4,006,478 | 2/1977 | Lewis et al. | 342/15 |
| 4,037,227 | 7/1977 | Kline | 342/15 |
| 4,072,949 | 2/1978 | Van Brunt | 342/15 |
| 4,117,484 | 9/1978 | Shizume | 342/15 |
| 4,121,214 | 10/1978 | Marinaccio et al. | 342/15 |
| 4,159,478 | 6/1979 | Jaklitsch et al. | 342/15 |
| 4,164,741 | 8/1979 | Schmidt | 342/15 |
| 4,219,775 | 8/1980 | Bozanic et al. | 324/313 |
| 4,314,248 | 2/1982 | White | 342/15 |
| 4,322,730 | 3/1982 | Chrzanowski | 342/15 |
| 4,328,496 | 5/1982 | White | 342/15 |

*Primary Examiner*—John B. Sotomayor
*Attorney, Agent, or Firm*—William G. Auton

[57] ABSTRACT

A method and system of producing phase front distortion wherein a pair of repeaters of electromagnetic waves are utilized in this system. The function of each repeater is to receive a signal from a distant source, amplify the signal and retransmit the signal back to the source. The pair of repeaters are designed so that the relative phase of the pair of repeated waves are precisely controlled at the center of the source. In addition, this phase control is automatic, independent of frequency, and independent of the angular location of the source. The transmitting antennas of the repeaters are separated by several feet so that the relative phase of the two waves received by the source varies across the source aperture.

2 Claims, 1 Drawing Sheet

METHOD AND SYSTEM OF PRODUCING PHASE FRONT DISTORTION

BACKGROUND OF THE INVENTION

This invention relates to a method and system of producing phase front distortion of electromagnetic waves.

One of the prior art methods and systems of producing phase front distortion included two repeaters, each with two antenna "horns". One repeater (the inner one) receives with the right horn, amplifies the signal and transmits from the left horn. The other repeater receives with the left horn, amplifies, phase shifts 180° and transmits from the right horn. To perform properly (relatively frequency independent) the path lengths of the two repeaters from the center of the source, through the repeater and back to the source must be identical except for the desired phase difference, in this case 180°, but several problems occur with this method and system: unwanted repeater antenna coupling, phase (path length) instability in the amplifiers, and phase instability in the path lengths between the amplifiers and the antennas.

Also in the prior art a two-horn system was designed to solve the antenna isolation problem and perhaps the phase instability problem in the paths to the antennas. In the two-horn method the two repeaters share antennas with a circulator used to isolate the signal received by one repeater from the signal transmitted by the other repeater. However, the two-horn method also has problems: circulators are not available with adequate isolation and the phase instability problem of the amplifiers remains.

It is to be noted that the aforementioned four-horn, and two-horn configuration may be also referred to as cross-eye configurations. A study of these two configurations were conducted and a brief summary of the results is presented.

The four-horn configuration operates as follows: the victim radar's transmitted signal is received in receiving antenna one. It is then amplified and repeated back through transmitting signal antenna one. Simultaneously, the victim radar's transmitting signal is also received in receiving antenna two. It is amplified, phase shifted 180°, and repeated back through transmitting antenna two. This setup allows the relative path lengths of the repeated signals to remain unchanged even if the geometry changes. The two-horn configuration uses circulators to eliminate two of the horns from the four-horn configuration. Sufficient circulator isolation is the primary requirement for the success of this configuration's operation. Preference was given to the two-horn version of cross-eye rather than the four-horn setup, because of the less severe phase-match problems associated with it (i.e., matched antenna-phase patterns, transmission-line characteristics, etc.). Although the two-horn implementation appeared more promising from the phase-matching standpoint, the circulator isolation requirement is difficult to achieve.

The present invention provides a method and system which eliminates some of the serious problems. Matching phase and gain in a pair of TWT (travelling wave tube) amplifier chains are a serious problem in both the four- and two-horn systems and meeting the antenna-isolation and circulator-isolations requirements of these respective systems are also a serious problem. The system described hereafter, multiplex "cross-eye", eliminates all the aforementioned problems.

SUMMARY OF THE INVENTION

The system of the present invention is comprises of two antennas separated by a predetermined distance, for example, an antenna located near each wing tip of an airborne object. A transmission line is provided feeding the phase distortion means which is located somewhere centrally in the aircraft. Signals received from the antennas are amplified alternately in a single TWT amplifier chain. Multiplexing is accomplished by a "ganged" pair of electronic switches. In one switch position, signals previously received by the left antenna and held in a delay line are being amplified and transmitted by the right antenna. In the alternate switch position, signals received by the right antenna are amplified, shifted 180° (by, for example, phase shifting means), and held in the delay line prior to transmission from the left antenna. When the switching period is exactly equal to the time delay, then the signals will exit the delay line simultaneously from the opposite ends. Switching period and frequency is defined here as the time between state changes and frequency of state changes, repectively.

In another embodiment of this system of this invention, the delay is eliminated with all the other components retained.

An object of the present invention is to provide a method and system of producing phase-front distortion of received electro-magnetic waves for retransmission to the source thereof.

Another object of the present invention is to provide a system including a pair of repeaters of electromagnetic waves in which repeater receives a signal from a distant source, amplifies the signal and retransmits the signal with a phase-front distortion.

DESCRIPTION OF PREFERRED EMBODIMENT

Figure 1:
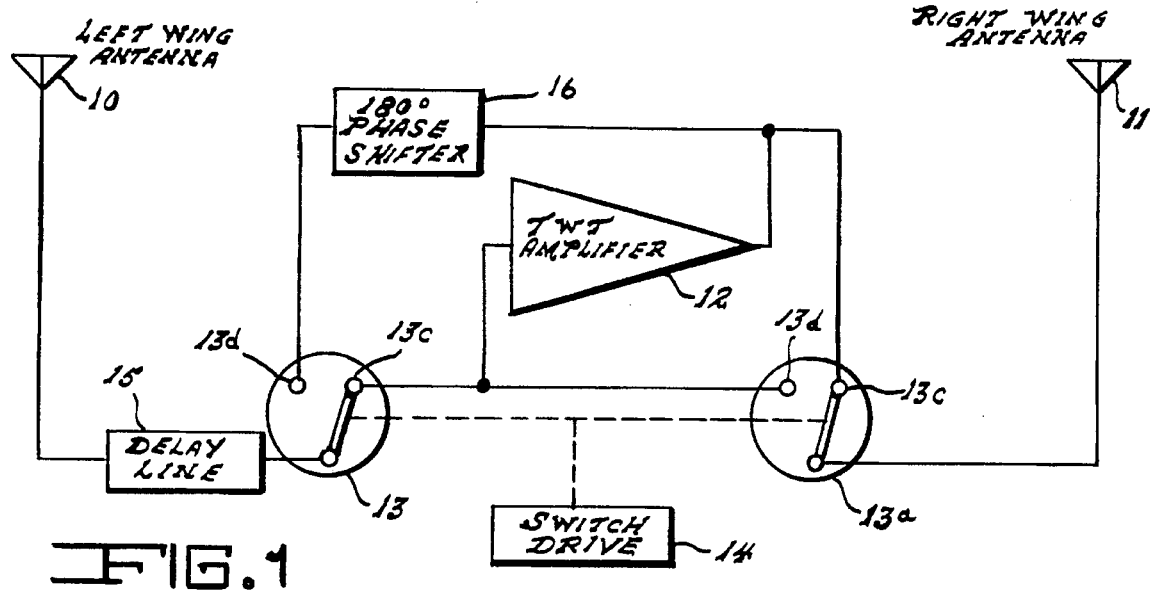
FIG. 1 is a first embodiment of the invention showing a system of producing a phase-front distortion of electromagnetic waves.

Now referring in detail in FIG. 1, there is shown left and right wing antennas 10 and 11 which may be located near each of the left and right wingtips, respectively, of an aircraft. Antennas 10 and 11 may be also mounted at any location for descriptive purposes at a predetermined distance from each other. Electromagnetic signals originating from a distant source are received by antennas 10 and 11 and are amplified alternately in single TWT amplifier 12. Multiplexing is accomplished by the use of "ganged" pair of switches 13 and 13a. Switches 13 and 13a are operated by switch drive 14 which may be conventional magnetically or mechanically driven. In the illustrated switch position 13c, signals previously received by left antenna 10 and held in delay line 15 are being amplified and transmitted by right antenna 11. In the alternate switch position 13d, signals received by right antenna 11 are amplified shifted 180° by 180° phase shifter 16 and held in delay line 15 prior to transmission from left antenna 10. When the switching period is exactly equal to the time delay, then the signals will exit the delay line simultaneously from the opposite ends. Switching period and frequency is here defined as the time between state changes and frequency of state changes, respectively.

With a predetermined alignment, the multiplex system is an almost identical-path cross-eye system. It is nearly an ideal automatic intrapulse system. Signals received in unison by the left and right antennas are transmitted, respectively by the right and left antennas in unison with a 180° shift in one path. The pair of signals travel identical paths in opposite directions, except for the poles of the switches and short connections to the amplifier.

The objective of the present invention thus required two repeaters which are identical in path length except for a controlled phase difference, it is obviously desirable to have as many common elements as possible in the two repeaters. Thus the two repeaters time-share the same antennas, the same path lengths to and from the antennas and the same amplifier. Isolation is provided by the time division and the isolation in the switches. The only parts of the two repeaters which are not common are the paths from the switch terminals to and from the amplifier input and output. These uncommon paths are made identical in length for the "two" repeaters except for the phase shift in one path (180° in this case). The two repeaters are defined as follows: When the switches are in position 13c, one repeater exists in which signals received by the left antenna are amplified and transmitted by the right antenna. The other repeater exists when the switches are thrown to the other position 13d, the signal from the right antenna is amplified and transmitted by the left antenna.

Delay line 15 is a memory device to permit the two repeaters will receive simultaneously and, after a delay, transmit simultaneously. Thus, the two repeaters have identical path lengths except for the controlled phase difference (180°). Although the two repeaters do not exist simultaneously, the delay line permits them to appear to exist simultaneously. Each of the two repeaters only exists at most half the time, but, with the switching rate fast compared to the bandwidth source the source will not be significantly affected by the periodic nature of the repeater pair. A particular advantage is the sharing of one amplifier, this permits phase modulation and provides phase stability, both difficult to obtain in the prior art.

In the system of FIG. 1, the switches shown are double-pole single-throw which may be magnetically or mechanically driven. However, other switches may be employed such as electronic microwave diode switches rather than mechanical switches. The diode switches may be driven by electronic pulse generators.

In some applications, it may be desirable to modulate the relative amplitude of the two repeaters. This can be accomplished by the use of modulators installed in any of the uncommon paths leading either to or from the amplifier. However, to maintain the desired phase stability these amplitude modulators must not introduce significant phase modulation.

Figure 2:
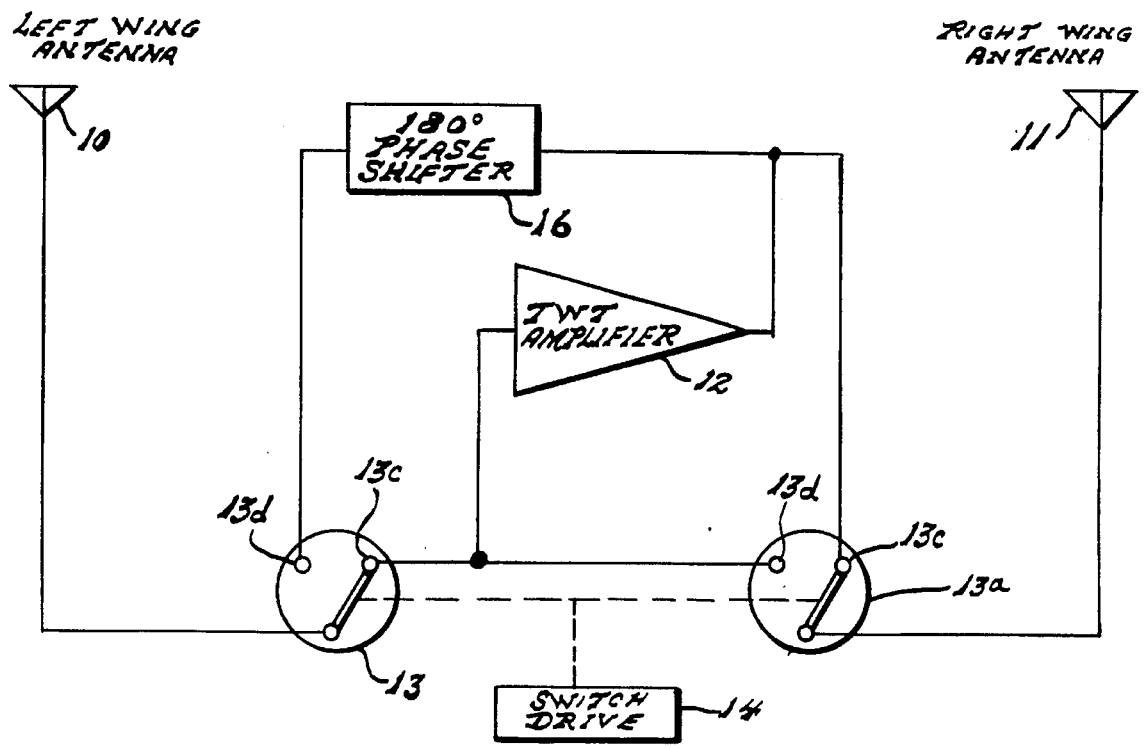
FIG. 2 shows a second embodiment of the invention.

Now referring to FIG. 2, there is shown the identical components and interconnections as in FIG. 1 with the exception that delay line 15 has been eliminated. It had previously appeared that it was necessary for the two repeaters to appear to exist simultaneously so that the electromagnetic waves would arrive at the source simultaneously. However, if the switching frequency is fast compared to the processing bandwidth of the sources receiver, then the delay line is not necessary, the two repeaters, appear to the sources receiver to be on, not only simultaneously, but continuously, regardless of the delay line.

It is noted that in place of 180° phase shifter 16, there may be substituted any other conventional type of phase shifter varied in some predetermined manner.

The present invention thus provides a system of producing phase-front distortion. A pair of repeaters of electromagnetic waves are utilized. The function of each repeater is to receive a signal from distant source, amplify the signal and retransmit the signal back to the source. The pair of repeaters are designed so that the relative phase of the pair of repeated waves are precisely controlled at the center of the source. In addition, this phase control is automatic, relatively independent of frequency, and independent of angular location of the source. The antennas of the repeaters must be separated several feet so that the relative phase of the two waves received by the source varies across the source aperture.

I claim:

1. A system of producing phase front distortion of an electromagnetic signal received from a distant source and thereafter be retransmitted thereto comprising first and second antennas separated from each other a predetermined distance, first switching means a first transmission line from said, first antenna to said first switching means, a single amplifier having input and output, a second transmission line from said first switching means to said input of said single amplifier, second switching means, a third transmission line from said output of said single amplifier to said second switching means, a fourth transmission line from said second switching means to said second antenna, a fifth transmission line from said second switching means to said input of said first amplifier a phase shifter having input and output, a sixth transmission line from said output of said single amplifier to said input of said phase shifter, a seventh transmission line from said output of said phase shifter to said first switching means, means connected to and driving said first and second switching means simultaneously at a predetermined rate alternating in first and second positions, with said first position connecting said first transmission line to said second transmission line and simultaneously said third transmission line to said fourth, and with said second position connecting said fourth transmission line to said fifth and simultaneously said seventh transmission line to said first.

2. A system of producing a phase-front distortion as described in claim 1 further including a delay line interposed in said first transmission line.

* * * * *